United States Patent
Chen et al.

(10) Patent No.: US 8,337,053 B2
(45) Date of Patent: Dec. 25, 2012

(54) LENS AND ILLUMINATION DEVICE HAVING SAME

(75) Inventors: Tien-Pao Chen, Miao-Li Hsien (TW); Chih-Ming Lai, Miao-Li Hsien (TW)

(73) Assignee: Foxsemicon Integrated Technology, Inc., Chu-Nan, Miao-Li Hsien (TW)

( * ) Notice: Subject to any disclaimer, the term of this patent is extended or adjusted under 35 U.S.C. 154(b) by 386 days.

(21) Appl. No.: 12/795,821

(22) Filed: Jun. 8, 2010

(65) Prior Publication Data
US 2011/0164425 A1    Jul. 7, 2011

(30) Foreign Application Priority Data
Jan. 5, 2010    (CN) .......................... 2010 1 0300043

(51) Int. Cl.
*F21V 3/00*    (2006.01)

(52) U.S. Cl. .......... 362/311.06; 362/296.06; 362/311.01

(58) Field of Classification Search ............ 362/311.06, 362/296.06, 311.01
See application file for complete search history.

(56) References Cited

U.S. PATENT DOCUMENTS

| | | | |
|---|---|---|---|
| 7,618,163 B2 * | 11/2009 | Wilcox | 362/336 |
| 7,985,009 B2 * | 7/2011 | Ho | 362/335 |
| 2010/0039810 A1 * | 2/2010 | Holder et al. | 362/235 |
| 2010/0073938 A1 | 3/2010 | Ho | |
| 2011/0075428 A1 * | 3/2011 | Chen et al. | 362/311.02 |

FOREIGN PATENT DOCUMENTS

| CN | 101487579 A | 7/2009 |
|---|---|---|
| TW | M364824 | 9/2009 |

* cited by examiner

*Primary Examiner* — Evan Dzierzynski
(74) *Attorney, Agent, or Firm* — Altis Law Group, Inc.

(57) ABSTRACT

A lens applied to a light emitting element includes a first surface profile and a second surface profile opposite to the first surface profile. The first surface profile defines a first trench facing the light emitting element, and the first trench includes a bottom curved surface serving as a light incident surface. The second surface profile includes a top curved surface, and serves as a light emitting surface. Both the bottom and the top curved surfaces are mirror symmetric to the first suppositional plane P1 (X=0), and mirror asymmetric to the second suppositional plane P2 (Y=0) to cooperatively adjust light from the light emitting element to obtain an asymmetric light field. An illumination device having the lens is further provided.

19 Claims, 8 Drawing Sheets

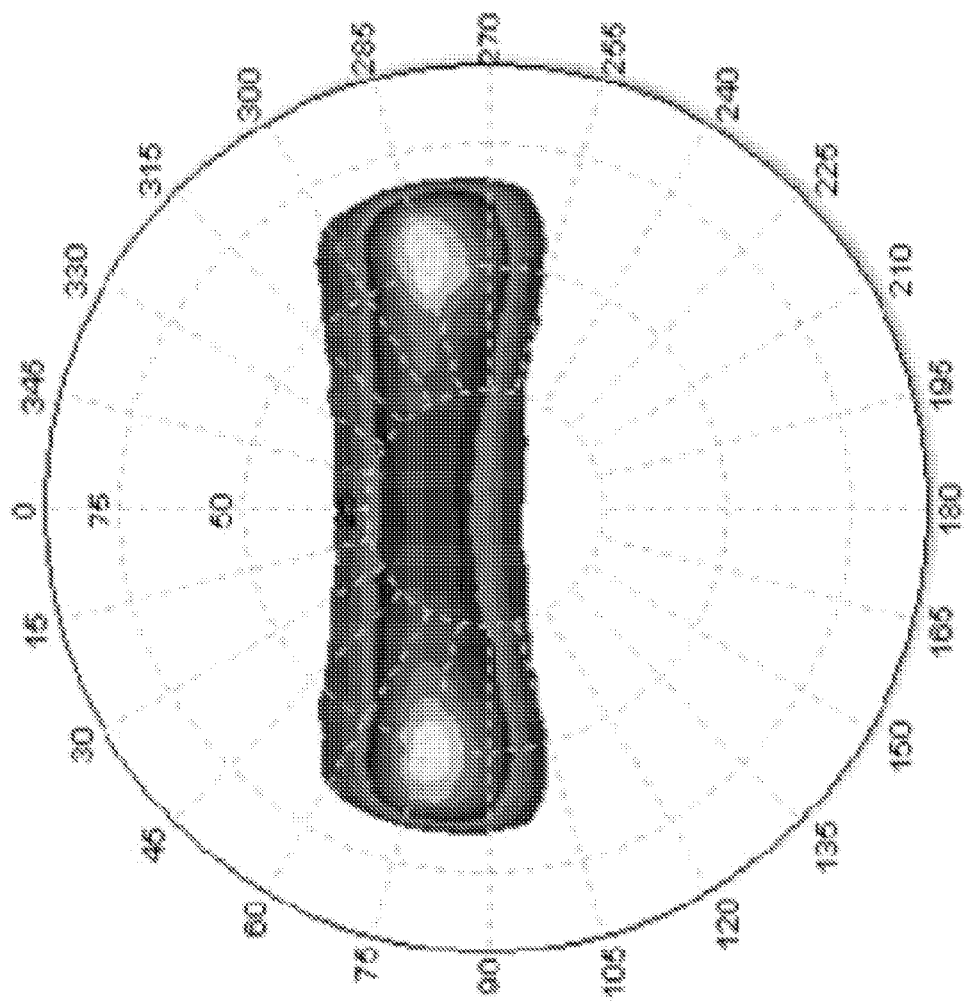
FIG. 8
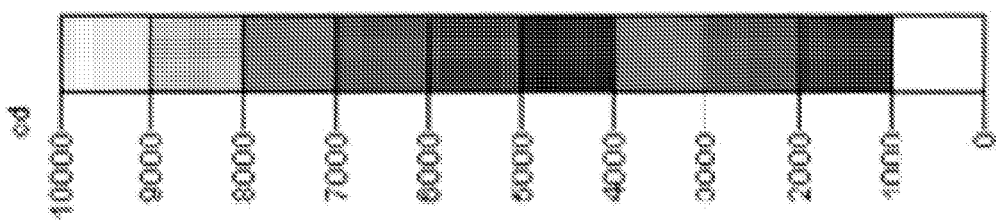

LENS AND ILLUMINATION DEVICE HAVING SAME

BACKGROUND

1. Technical Field

The present disclosure relates to an optical device, and particularly, to a lens for forming asymmetric light field and an illumination device having the same.

2. Description of Related Art

Light emitting elements (LEDs) are extensively applied due to high brightness. LED illumination device usually provides a symmetrical light field with a circular cross-section. However, sometimes an asymmetric light field is required or preferred for specific illumination or power-saving applications. For example, it is preferred that a streetlamp illuminates on the road than on the space behind the streetlamp.

Therefore, it is desirable to provide an illumination device which can overcome the described limitations.

BRIEF DESCRIPTION OF THE DRAWINGS

Many aspects of the disclosure can be better understood with reference to the drawings. The components in the drawings are not necessarily drawn to scale, the emphasis instead being placed upon clearly illustrating the principles of the present image capture device and control method thereof. Moreover, in the drawings, like reference numerals designate corresponding parts throughout the views.

FIG. 8 is a graph of polar candela distribution of the illumination device shown in FIG. 5.

DETAILED DESCRIPTION

Embodiments of the disclosure will now be described in detail with reference to the accompanying drawings.

Figure 1:
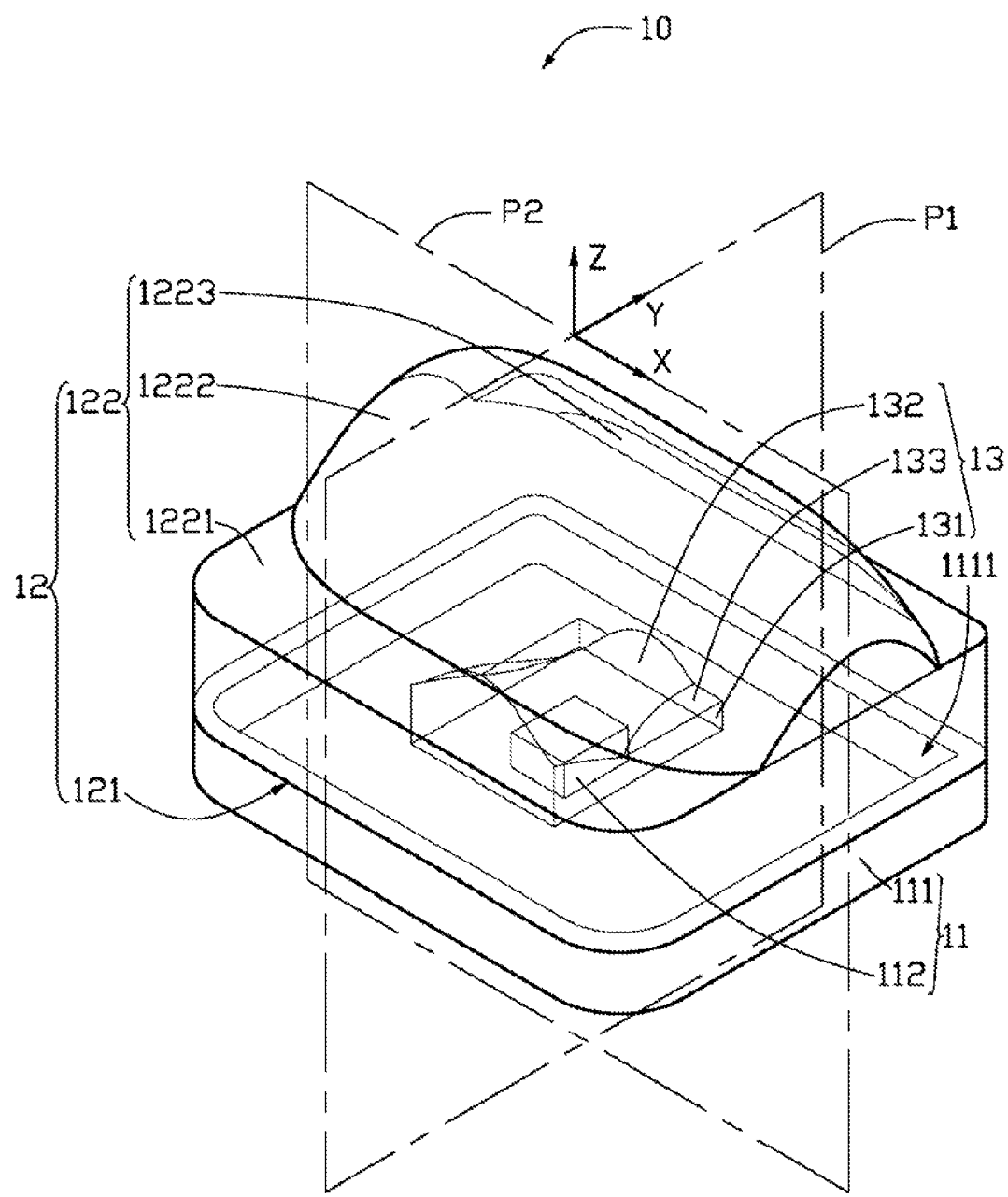
FIG. 1 is a schematic view of an illumination device according to a first embodiment of the present disclosure.
Figure 2:
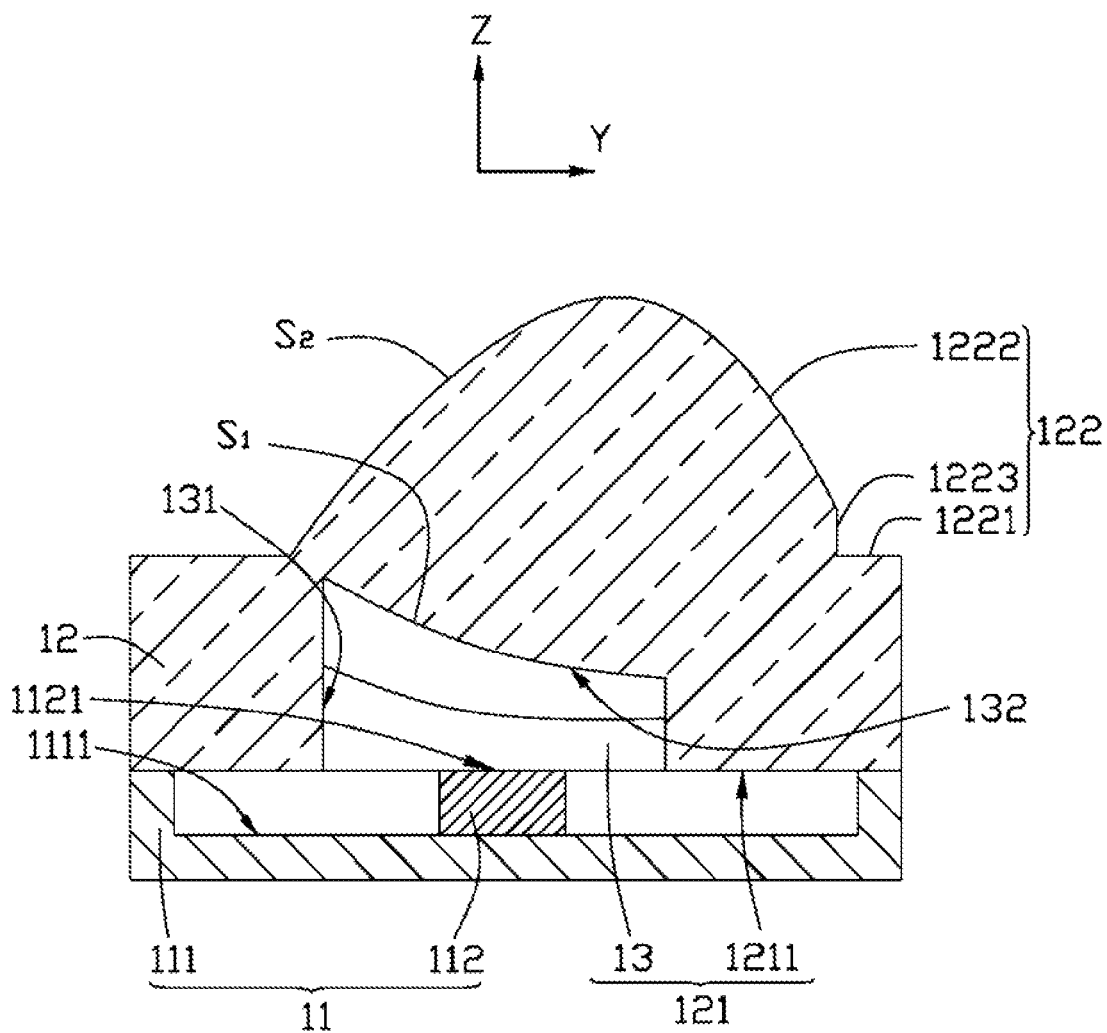
FIG. 2 is a schematic cross section of the illumination device along a first suppositional plane P1 shown in FIG. 1.

Referring to FIG. 1 and FIG. 2, an illumination device 10 according to a first embodiment of the present disclosure includes a light source 11 and a lens 12 facing the light source 11.

The light source 11 includes a base 111 and a light emitting element 112. The base 111 is a housing including a flat rectangular bottom plate and four sidewall plates located on the four edges of the bottom plate. Accordingly, the base 111 includes an inner surface 1111 defining a trench, and the light emitting element 112 is mounted on the inner surface 1111 in the trench. The light emitting element 112 can be electrically connected to the base 111, but is not limited thereto. The light emitting element 112 can be any proper apparatus, such as a halogen lamp or a light emitting diode.

The lens 12 substantially has a hexahedron body. The lens 12 includes a first surface profile 121 facing the inner surface 1111, and a second surface profile 122 opposite to the first surface profile 121. The first surface profile 121 defines a trench 13 facing the light emitting element 112, and a planar surface 1211 surrounding the trench 13. The trench 13 is generally located at the geometric center of the planar surface 1211, and cooperates with the inner surface 1111 to house the light emitting element 112. The trench 13 is substantially rectangular when viewed from the top, and the light emitting element 112 is generally located at the geometric center of the rectangle. The trench 13 includes a bottom curved surface 132, four planar sidewalls 131, and two bottom planar surfaces 133. Neighboring two of the planar sidewalls 131 are perpendicular to each other. The four planar sidewalls 131 are connected to and surround the bottom curved surface 132. The bottom curved surface 132 can be a saddle-shaped concavity, serving as a light incident surface. The bottom planar surfaces 133 are located on opposite sides of the bottom curved surface 132 along the X-axis.

The second surface profile 122 serves as a light emitting surface. The second surface profile 122 includes a top curved surface 1222, two top planar surfaces 1221 substantially parallel to the planar surface 1211, and a planar sidewall 1223 perpendicular to the planar surface 1211. The planar surfaces 1221 are connected to the top curved surface 1222 and located on opposite sides of the top curved surface 1222 along the Y-axis. The top curved surface 1222 may be convex.

Both the bottom curved surface 132 and the top curved surface 1222 are mirror symmetric to a first suppositional plane P1 (X=0), and mirror asymmetric to a second suppositional plane P2 (Y=0) perpendicular to the first suppositional plane P1 to cooperatively adjust light from the light source 11 to obtain an asymmetric light field in the present disclosure. Both the first and second suppositional planes P1, P2 are substantially perpendicular to the planar surface 1211. In this embodiment, the first suppositional plane P1 crosses the second suppositional plane P2 at the center axis of the lens 12. Thus, the Z-axis overlaps the center axis of the lens 12, but is not limited thereto.

For forming an asymmetric light field, the bottom curved surface 132 can be a locus of points (X, Y, Z) in accordance with a formula:

$$Z = A_0 + A_1 X^2 + A_2 X^4 + A_3 X^6 + A_4 X^8 + B_1 Y + B_2 Y^2 + B_3 Y^3 + B_4 Y^4 + B_5 Y^5 + B_6 Y^6 + B_7 Y^7 + B_8 Y^8 + B_9 Y^9$$

At least one of constants $A_0$, $A_1$, $A_2$, $A_3$ and $A_4$ is not zero, and at least one of constants $B_1$, $B_2$, $B_3$, $B_4$, $B_5$, $B_6$, $B_7$, $B_8$ and $B_9$ is not zero. It is shown that the formula is an even function to the variable X, meaning $Z=f(X, Y)=f(-X, Y)$, so the bottom curved surface 132 is mirror symmetric to the first suppositional plane P1. It is also shown that the formula is not an even function to the variable Y, meaning $f(X, Y)$ may not be equal to $f(X, -Y)$, so the bottom curved surface 132 is mirror asymmetric to the second suppositional plane P2.

Specifically, the constants $A_1$, $A_2$, $A_3$, $A_4$, $B_1$, $B_2$, $B_3$, $B_4$, $B_5$, $B_6$, $B_7$, $B_8$ and $B_9$ of the bottom curved surface 132 are in a range from $-2.7 \times 10^{-1}$ to $-2.6 \times 10^{-1}$, in a range from $6.8 \times 10^{-3}$ to $6.9 \times 10^{-3}$, in a range from $1.0 \times 10^{-4}$ to $1.1 \times 10^{-4}$, in a range from $-1.9 \times 10^{-6}$ to $-1.8 \times 10^{-6}$, in a range from $-4.4 \times 10^{-1}$ to $-4.3 \times 10^{-1}$, in a range from $2.6 \times 10^{-2}$ to $2.7 \times 10^{-2}$, in a range from $1.2 \times 10^{-2}$ to $1.3 \times 10^{-2}$, in a range from $1.9 \times 10^{-4}$ to $2.0 \times 10^{-4}$, in a range from $1.9 \times 10^{-4}$ to $2.0 \times 10^{-4}$, in a range from $-1.4 \times 10^{-5}$ to $-1.3 \times 10^{-5}$, in a range from $1.4 \times 10^{-8}$ to $1.5 \times 10^{-8}$, in a range from $-2.0 \times 10^{-9}$ to $-1.9 \times 10^{-9}$, and in a range from $2.0 \times 10^{-10}$ to $2.1 \times 10^{-10}$ respectively.

The constants $A_1$, $A_2$, $A_3$, $A_4$, $B_1$, $B_2$, $B_3$, $B_4$, $B_5$, $B_6$, $B_7$, $B_8$ and $B_9$ of the bottom curved surface 132 are about $-2.6715952 \times 10^{-1}$, $6.86381 \times 10^{-3}$, $1.0466378 \times 10^{-4}$, $-1.8830547 \times 10^{-6}$, $-4.3020893 \times 10^{-1}$, $2.6198216 \times 10^{-2}$, $1.2308106\times10^{-2}$, $1.9743788\times10^{-4}$, $1.9513862\times10^{-4}$, $-1.3144802\times10^{-5}$, $1.4624037\times10^{-8}$, $-1.9687823\times10^{-9}$, and $2.0971818\times10^{-10}$ respectively.

The top curved surface 1222 can be a locus of points (X, Y, Z) in accordance with a formula:

$$Z=C_0+C_1X^2+C_2X^4+C_3X^6+C_4X^8+D_1Y+D_2Y^2+D_3Y^3+D_4Y^4+D_5Y^5+D_6Y^6+D_7Y^7+D_8Y^8+D_9Y^9$$

At least one of constants $C_0$, $C_1$, $C_2$, $C_3$ and $C_4$ is not zero, and at least one of constants $D_1$, $D_2$, $D_3$, $D_4$, $D_5$, $D_6$, $D_7$, $D_8$ and $D_9$ is not zero. The constants $C_1$, $C_2$, $C_3$, $C_4$, $D_1$, $D_2$, $D_3$, $D_4$, $D_5$, $D_6$, $D_7$, $D_8$ and $D_9$ of the top curved surface 1222 are in a range from $6.4\times10^{-3}$ to $6.5\times10^{-3}$, in a range from $-3.0\times10^{-4}$ to $-2.9\times10^{-4}$, in a range from $2.3\times10^{-7}$ to $2.4\times10^{-7}$, in a range from $-1.3\times10^{-9}$ to $-1.2\times10^{-9}$, in a range from $7.6\times10^{-1}$ to $7.7\times10^{-1}$, in a range from $-9.1\times10^{-2}$ to $-9.0\times10^{-2}$, in a range from $7.7\times10^{-3}$ to $7.8\times10^{-3}$, in a range from $6.5\times10^{-4}$ to $6.6\times10^{-4}$, in a range from $8.7\times10^{-5}$ to $8.8\times10^{-5}$, in a range from $-1.5\times10^{-6}$ to $-1.4\times10^{-6}$, in a range from $2.6\times10^{-8}$ to $2.7\times10^{-8}$, in a range from $-6.5\times10^{-10}$ to $-6.4\times10^{-10}$, and in a range from $9.6\times10^{-11}$ to $9.7\times10^{-11}$ respectively.

The constants $C_1$, $C_2$, $C_3$, $C_4$, $D_1$, $D_2$, $D_3$, $D_4$, $D_5$, $D_6$, $D_7$, $D_8$ and $D_9$ of the top curved surface 1222 are about $6.4677853\times10^{-3}$, $-2.9407563\times10^{-4}$, $2.341043\times10^{-7}$, $-1.2410138\times10^{-9}$, $7.6531489\times10^{-1}$, $-9.0638601\times10^{-2}$, $7.7596244\times10^{-3}$, $6.5303928\times10^{-4}$, $8.7980963\times10^{-5}$, $-1.4739223\times10^{-6}$, $2.6172271\times10^{-8}$, $-6.4024795\times10^{-10}$, and $9.6158865\times10^{-11}$ respectively.

As shown in FIG. 2, the first suppositional plane P1, which is the plane of symmetry, crosses the bottom curved surface 132 and the top curved surface 1222 at a bottom curve $S_1$ and a top curve $S_2$ in accordance with formulas:

$$Z=A_0+B_1Y+B_2Y^2+B_3Y^3+B_4Y^4+B_5Y^5+B_6Y^6+B_7Y^7+B_8Y^8+B_9Y^9; \text{ and}$$

$$Z=C_0+D_1Y+D_2Y^2+D_3Y^3+D_4Y^4+D_5Y^5+D_6Y^6+D_7Y^7+D_8Y^8+D_9Y^9$$

In this embodiment, the opposite terminals of the bottom curve $S_1$ are the highest point and the lowest point of the bottom curve $S_1$. One terminal of the top curve $S_2$ is the lowest point of the top curve $S_2$, while the highest point of the top curve $S_2$ is not on the terminal. The geometric center of the bottom curve $S_1$ and that of the top curve $S_2$ are not aligned in one vertical plane. The highest point of $S_2$ is apart from the center axis of the lens 12 so to lead the light illuminate toward the positive direction of Y-axis.

The light emitting element 112 may be located at the geometric center of the rectangle of the trench 13 when viewed from the top; in other words, distances from the planar sidewalls 131 to the light emitting element 112 are substantially the same, and the light emitting element 112 is located at a point (X, Y)=(0, 0). The bottom planar surface 1211 and a light emitting surface 1121 of the light emitting element 112 are substantially located at the same level, but are not limited thereto.

Figure 3:
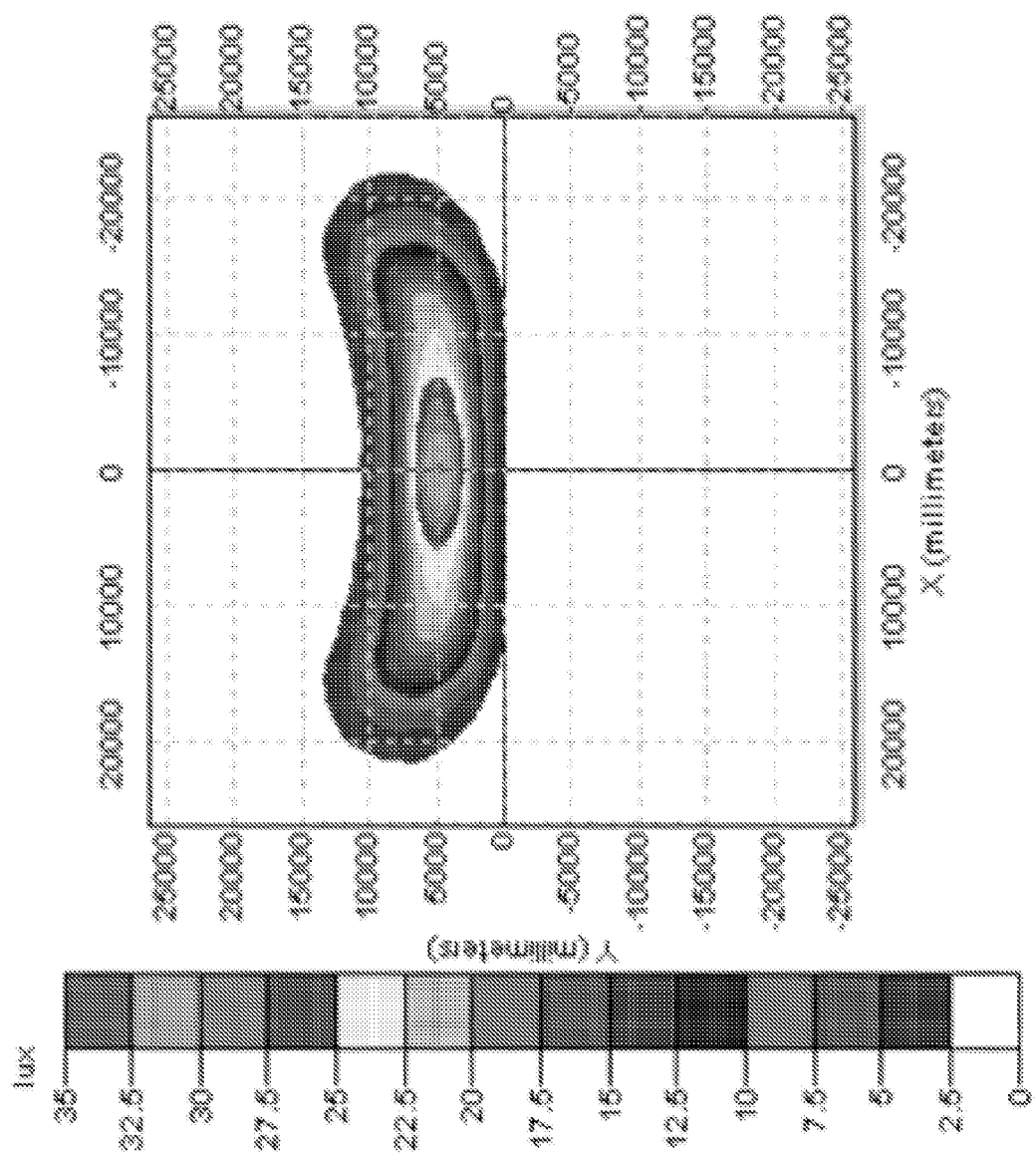
FIG. 3 is a graph of luminance distribution of the illumination device shown in FIG. 1.
Figure 4:
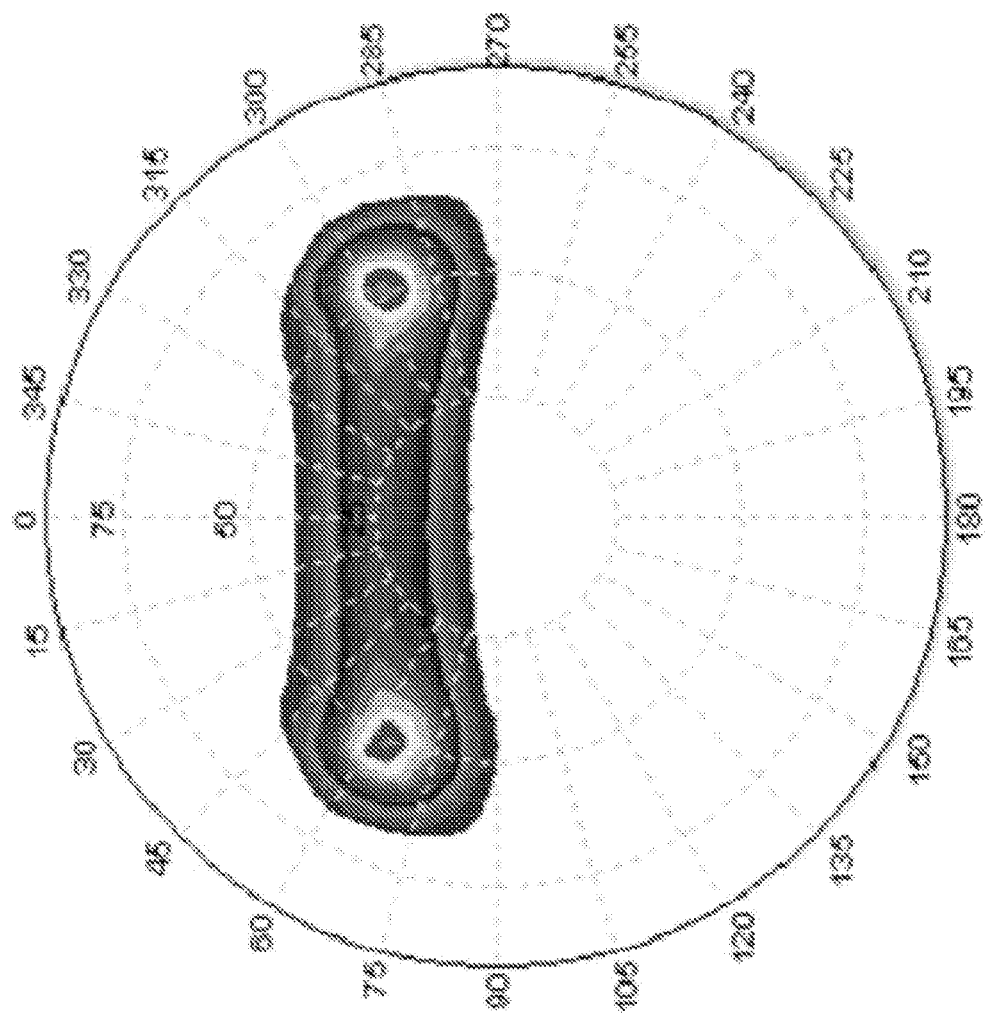
FIG. 4 is a graph of polar candela distribution of the illumination device shown in FIG. 1.
Figure 4:
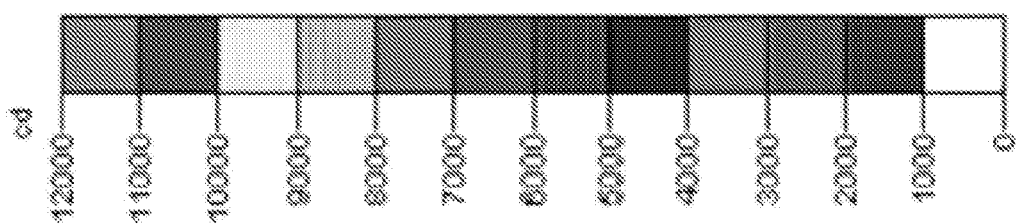

Graphs showing luminance distribution and polar candela distribution of the illumination device 10 are shown in FIG. 3 and FIG. 4. The luminance distribution is the pattern of ground illumination apart from the illumination device 10 about 12 meters. The candela distribution is a measurement of the luminous intensity of the illumination device 10. Since the bottom and the top curved surfaces 132, 1222 are mirror symmetric to the first suppositional plane P1 and mirror asymmetric to the second suppositional plane P2, light from the light source 11 are adjusted to be an asymmetric light field mirror symmetric to Y-axis (the first suppositional plane P1) and mirror asymmetric to X-axis (the second suppositional plane P2). The main illumination is distributed toward the positive direction of the Y-axis, and no illumination is wasted on regions along the negative direction of the Y-axis.

Accordingly, the asymmetric light field is obtained without tilting the illumination device 10, and the reliability of the illumination device 10 is improved. When applied in a streetlamp, such an illumination device 10 is especially useful in circumstance such as on a bridge that needs no illumination behind the streetlamp. That is, the base 111 and the bottom planar surface 1211 are substantially parallel to the illuminated object such as the road surface.

Figure 5:
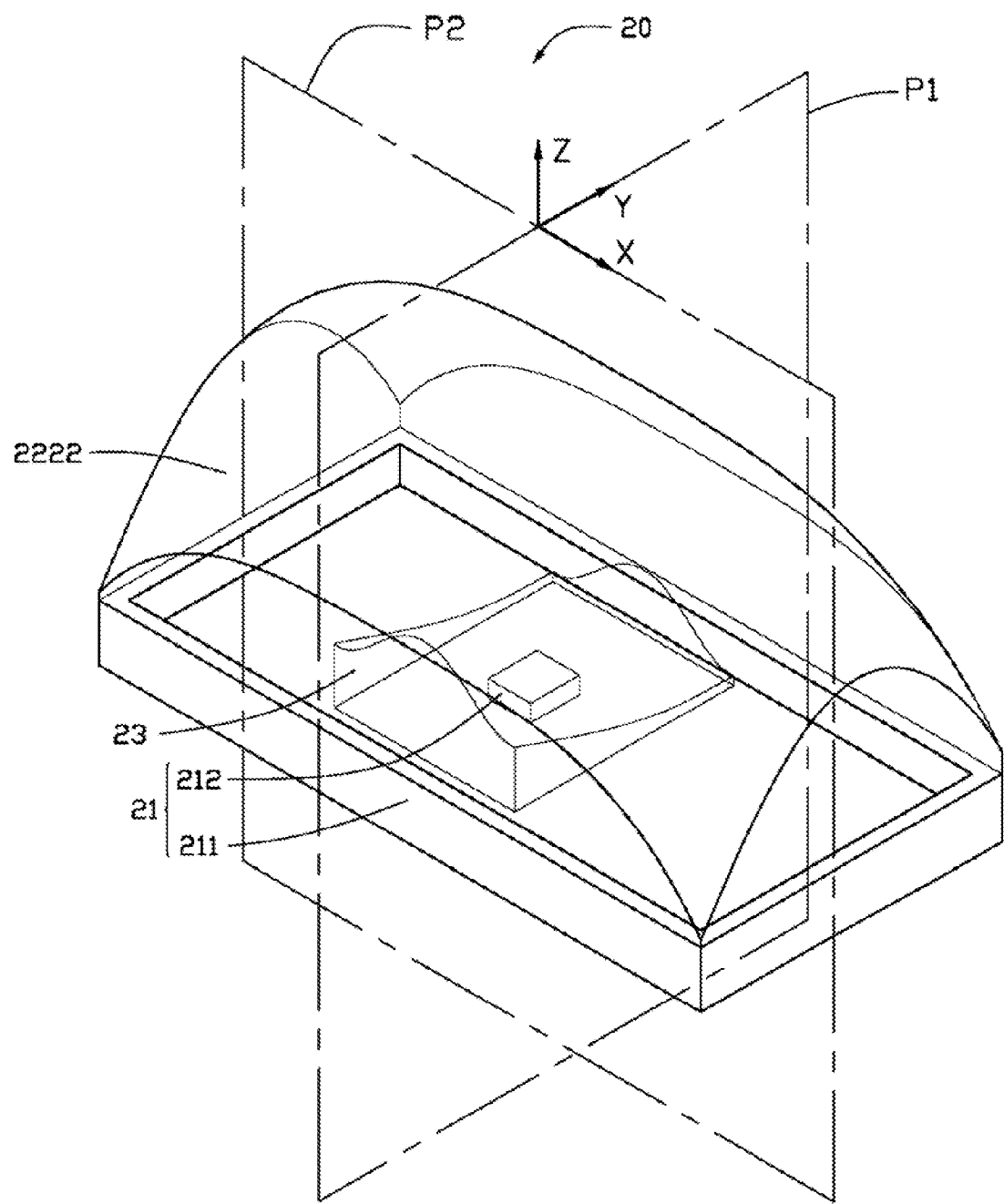
FIG. 5 is a schematic view of an illumination device according to a second embodiment of the present disclosure.
Figure 6:
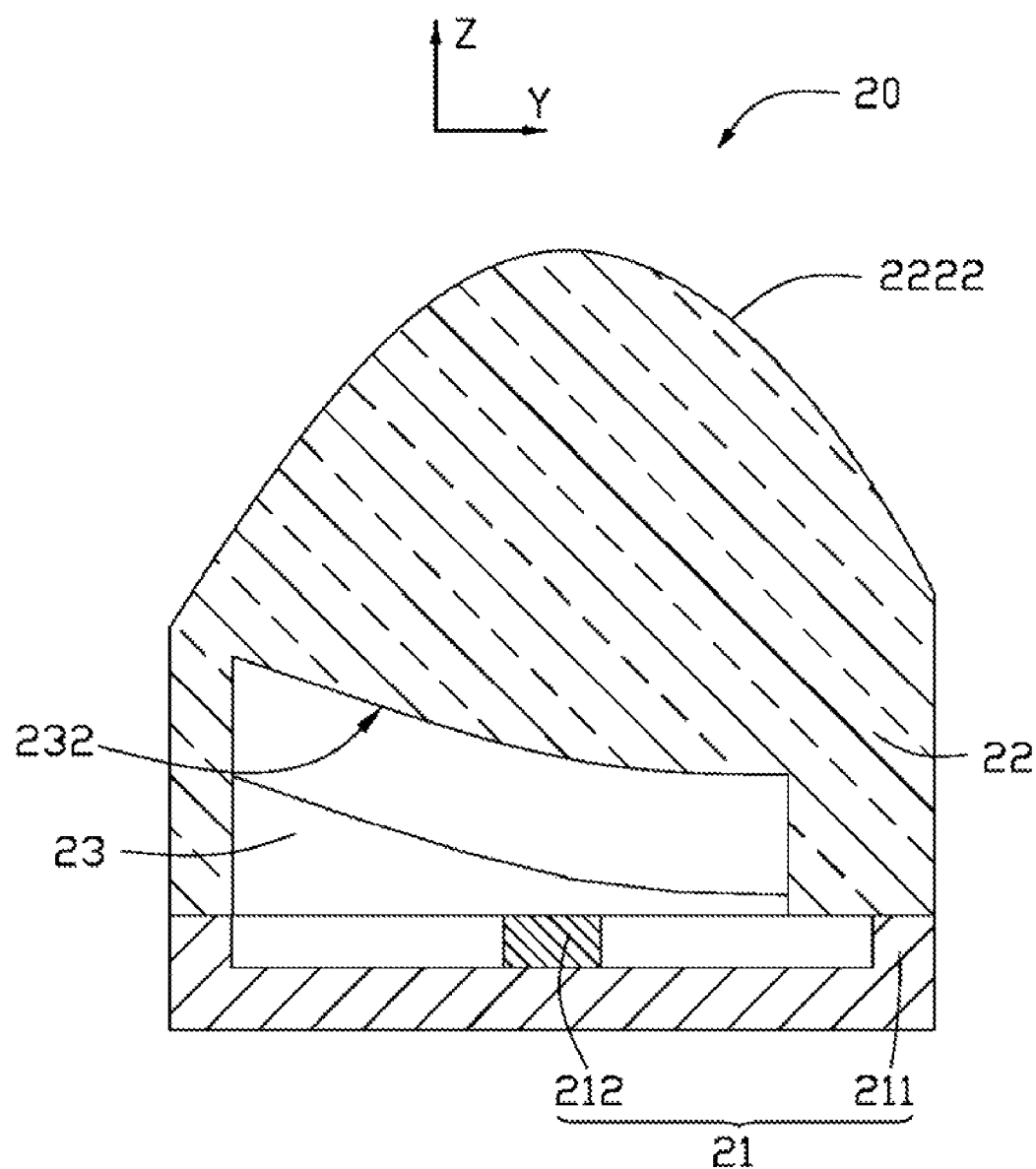
FIG. 6 is a schematic cross section of the illumination device along a first suppositional plane P1 shown in FIG. 5.

Referring to FIG. 5 and FIG. 6, an illumination device 20 according to a second embodiment of the present disclosure includes a light source 21 and a lens 22. The light source 21 includes a base 211 and a light emitting element 212. The main difference from the first embodiment is the shape of the lens 22 in this embodiment.

The bottom curved surface 232 of the trench 23 defined in the first surface profile can be a locus of points (X, Y, Z) in accordance with a formula:

$$Z=A_0+A_1X^2+A_2X^4+A_3X^6+A_4X^8+B_1Y+B_2Y^2+B_3Y^3+B_4Y^4+B_5Y^5+B_6Y^6+B_7Y^7+B_8Y^8+B_9Y^9$$

The constants $A_1$, $A_2$, $A_3$, $A_4$, $B_1$, $B_2$, $B_3$, $B_4$, $B_5$, $B_6$, $B_7$, $B_8$ and $B_9$ of the bottom curved surface 232 are in a range from $-3.6\times10^{-1}$ to $-3.5\times10^{-1}$, in a range from $1.6\times10^{-2}$ to $1.7\times10^{-2}$, in a range from $4.2\times10^{-4}$ to $4.3\times10^{-4}$, in a range from $-2.3\times10^{-5}$ to $-2.2\times10^{-5}$, in a range from $-2.6\times10^{-1}$ to $-2.5\times10^{-1}$, in a range from $3.2\times10^{-2}$ to $3.3\times10^{-2}$, in a range from $4.1\times10^{-3}$ to $4.2\times10^{-3}$, in a range from $-2.4\times10^{-4}$ to $-2.3\times10^{-4}$, in a range from $-1.1\times10^{-4}$ to $-1.0\times10^{-4}$, in a range from $-7.0\times10^{-6}$ to $-6.9\times10^{-6}$, in a range from $6.1\times10^{-8}$ to $6.2\times10^{-8}$, in a range from $-2.9\times10^{-9}$ to $-2.8\times10^{-9}$, and in a range from $-1.3\times10^{-9}$ to $-1.2\times10^{-9}$ respectively.

The constants $A_1$, $A_2$, $A_3$, $A_4$, $B_1$, $B_2$, $B_3$, $B_4$, $B_5$, $B_6$, $B_7$, $B_8$ and $B_9$ of the bottom curved surface 232 are about $-3.5290493\times10^{-1}$, $1.6001909\times10^{-2}$, $4.2567413\times10^{-4}$, $-2.2489143\times10^{-5}$, $-2.5393082\times10^{-1}$, $3.2619842\times10^{-2}$, $4.1768372\times10^{-3}$, $-2.3357429\times10^{-4}$, $-1.043211\times10^{-4}$, $-6.9729936\times10^{-6}$, $6.1875902\times10^{-8}$, $-2.8604671\times10^{-9}$, and $-1.2223995\times10^{-9}$ respectively.

The second surface profile includes no top planar surface in this embodiment. The top curved surface 2222 of the second surface profile can be a locus of points (X, Y, Z) in accordance with a formula:

$$Z=C_0+C_1X^2+C_2X^4+C_3X^6+C_4X^8+D_1Y+D_2Y^2+D_3Y^3+D_4Y^4+D_5Y^5+D_6Y^6+D_7Y^7+D_8Y^8+D_9Y^9$$

The constants $C_1$, $C_2$, $C_3$, $C_4$, $D_1$, $D_2$, $D_3$, $D_4$, $D_5$, $D_6$, $D_7$, $D_8$ and $D_9$ of the top curved surface 2222 are in a range from $1.6\times10^{-3}$ to $1.7\times10^{-3}$, in a range from $2.8\times10^{-4}$ to $2.9\times10^{-4}$, in a range from $4.3\times10^{-7}$ to $4.4\times10^{-7}$, in a range from $-1.7\times10^{-9}$ to $-1.6\times10^{-9}$, in a range from $3.2\times10^{-1}$ to $3.3\times10^{-1}$, in a range from $-2.0\times10^{-1}$ to $-1.9\times10^{-1}$, in a range from $-1.6\times10^{-3}$ to $-1.5\times10^{-3}$, in a range from $1.1\times10^{-3}$ to $1.2\times10^{-3}$, in a range from $-5.5\times10^{-5}$ to $-5.4\times10^{-5}$, in a range from $-6.7\times10^{-6}$ to $-6.6\times10^{-6}$, in a range from $2.2\times10^{-7}$ to $2.3\times10^{-7}$, in a range from $-9.9\times10^{-8}$ to $-9.8\times10^{-8}$, and in a range from $-8.0\times10^{-10}$ to $-7.9\times10^{-10}$ respectively.

The constants $C_1$, $C_2$, $C_3$, $C_4$, $D_1$, $D_2$, $D_3$, $D_4$, $D_5$, $D_6$, $D_7$, $D_8$ and $D_9$ of the top curved surface 2222 are about $1.6217233\times10^{-3}$, $2.824951\times10^{-4}$, $4.385228\times10^{-7}$, $-1.699195\times10^{-9}$, $3.2046131\times10^{-1}$, $-1.9123229\times10^{-1}$, $-1.5327618\times10^{-3}$, $1.1685353\times10^{-3}$, $-5.4857556\times10^{-5}$, $-6.6363589\times10^{-6}$, $2.2486306\times10^{-7}$, $-9.8377082\times10^{-8}$, and $-7.9964588\times10^{-10}$ respectively.

Figure 7:
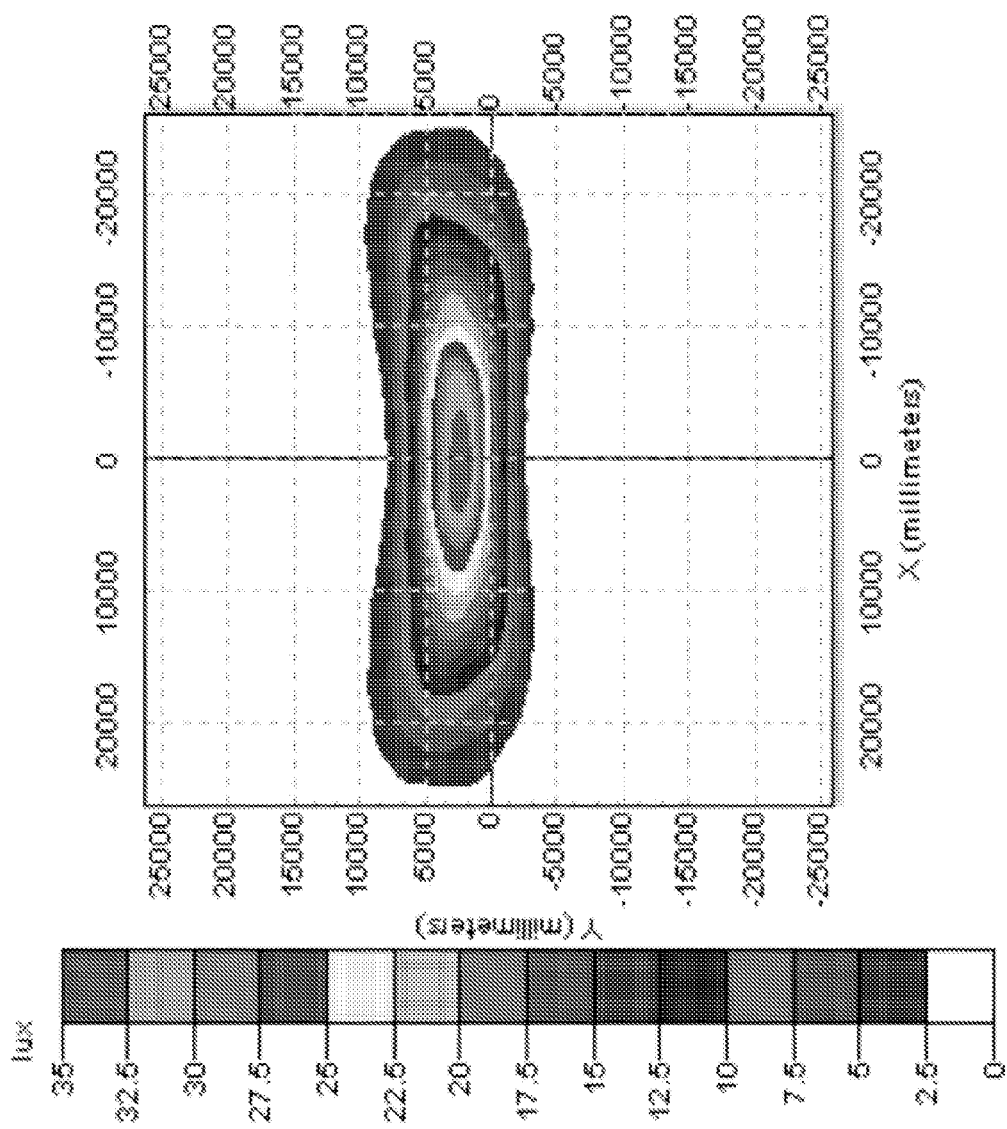
FIG. 7 is a graph of luminance distribution of the illumination device shown in FIG. 5.

Graphs of luminance distribution and a polar candela distribution of the illumination device 20 are shown in FIG. 7 and FIG. 8. Accordingly, light from the light source 21 are adjusted to be an asymmetric light field mirror symmetric to the Y-axis (the first suppositional plane P1) and mirror asymmetric to the X-axis (the second suppositional plane P2). In comparison to the first embodiment, a little illumination is distributed in the region along the negative direction of the Y-axis in this embodiment, and the illumination device 20 is useful as a streetlamp near a sidewalk that needs a little illumination behind the streetlamp.

It is noted that the bottom curved surface 132 (232) and the top curved surface 1222 (2222) are not limited to the above-mentioned formulas and constants. The arrangements, numbers, positions and structures of the light emitting element 112 (212), base 111 (211) and lens 12 (22) can be adjusted as required. For example, the base can be just a flat plate in other embodiments. The application of the present disclosure is not limited thereto.

It is to be understood, however, that even though numerous characteristics and advantages of various embodiments have been set forth in the foregoing description, together with details of the structures and functions of the embodiments, the disclosure is illustrative only; and that changes may be made in detail, especially in matters of arrangement of parts within the principles of the invention to the full extent indicated by the broad general meaning of the terms in which the appended claims are expressed.

What is claimed is:

1. A lens configured for being applied to a light emitting element to adjust light from the light emitting element, comprising:
    a first surface profile defining a first trench facing the light emitting element, the first trench comprising a bottom curved surface serving as a light incident surface, four planar sidewalls surrounding and connected to the bottom curved surface, and two bottom planar surfaces connected to the bottom curved surface and perpendicular to the planar sidewalls; and
    a second surface profile serving as a light emitting surface opposite to the first surface profile, the second surface profile comprising a top curved surface, wherein both the bottom curved surface and the top curved surface are mirror symmetric to a first suppositional plane, and mirror asymmetric to a second suppositional plane perpendicular to the first suppositional plane to cooperatively adjust the light from the light emitting element to obtain an asymmetric light field.

2. The lens of claim 1, wherein the bottom curved surface is a saddle-shaped concavity, and the top curved surface is convex.

3. The lens of claim 1, wherein the second surface profile further comprises two top planar surfaces connected to the top curved surface and perpendicular to the planar sidewalls.

4. The lens of claim 1, wherein the bottom curved surface is a locus of points (X, Y, Z) in accordance with a formula:

$$Z=A_0+A_1X^2+A_2X^4+A_3X^6+A_4X^8+B_1Y+B_2Y^2+B_3Y^3+B_4Y^4+B_5Y^5+B_6Y^6+B_7Y^7+B_8Y^8+B_9Y^9;$$

at least one of constants $A_0, A_1, A_2, A_3$ and $A_4$ is not zero, and at least one of constants $B_1, B_2, B_3, B_4, B_5, B_6, B_7, B_8$ and $B_9$ is not zero.

5. The lens of claim 4, wherein the constants $A_1, A_2, A_3, A_4, B_1, B_2, B_3, B_4, B_5, B_6, B_7, B_8$ and $B_9$ of the bottom curved surface are in a range from $-2.7\times10$-1 to $-2.6\times10$-1, in a range from $6.8\times10$-3 to $6.9\times10$-3, in a range from $1.0\times10$-4 to $1.1\times10$-4, in a range from $-1.9\times10$-6 to $-1.8\times10$-6, in a range from $-4.4\times10$-1 to $-4.3\times10$-1, in a range from $2.6\times10$-2 to $2.7\times10$-2, in a range from $1.2\times10$-2 to $1.3\times10$-2, in a range from $1.9\times10$-4 to $2.0\times10$-4, in a range from $1.9\times10$-4 to $2.0\times10$-4, in a range from $-1.4\times10$-5 to $-1.3\times10$-5, in a range from $1.4\times10$-8 to $1.5\times10$-8, in a range from $-2.0\times10$-9 to $-1.9\times10$-9, and in a range from $2.0\times10$-10 to $2.1\times10$-10 respectively.

6. The lens of claim 1, wherein the top curved surface is a locus of points (X, Y, Z) in accordance with a formula:

$$Z=C_0+C_1X^2+C_2X^4+C_3X^6+C_4X^8+D_1Y+D_2Y^2+D_3Y^3+D_4Y^4+D_5Y^5+D_6Y^6+D_7Y^7+D_8Y^8+D_9Y^9;$$

at least one of constants $C_0, C_1, C_2, C_3$ and $C_4$ is not zero, and at least one of constants $D_1, D_2, D_3, D_4, D_5, D_6, D_7, D_8$ and $D_9$ is not zero.

7. The lens of claim 6, wherein the constants $C_1, C_2, C_3, C_4, D_1, D_2, D_3, D_4, D_5, D_6, D_7, D_8$ and $D_9$ of the top curved surface are in a range from $6.4\times10$-3 to $6.5\times10$-3, in a range from $-3.0\times10$-4 to $-2.9\times10$-4, in a range from $2.3\times10$-7 to $2.4\times10$-7, in a range from $-1.3\times10$-9 to $-1.2\times10$-9, in a range from $7.6\times10$-1 to $7.7\times10$-1, in a range from $-9.1\times10$-2 to $-9.0\times10$-2, in a range from $7.7\times10$-3 to $7.8\times10$-3, in a range from $6.5\times10$-4 to $6.6\times10$-4, in a range from $8.7\times10$-5 to $8.8\times10$-5, in a range from $-1.5\times10$-6 to $-1.4\times10$-6, in a range from $2.6\times10$-8 to $2.7\times10$-8, in a range from $-6.5\times10$-10 to $-6.4\times10$-10, and in a range from $9.6\times10$-11 to $9.7\times10$-11 respectively.

8. An illumination device, comprising:
    a light source comprising:
        a base; and
        a light emitting element located on the base; and
    a lens comprising:
        a first surface profile defining a first trench facing the light emitting element, the first trench comprising a bottom curved surface serving as a light incident surface, four planar sidewalls surrounding and connected to the bottom curved surface, and two bottom planar surfaces connected to the bottom curved surface and perpendicular to the planar sidewalls; and
        a second surface profile serving as a light emitting surface opposite to the first surface profile, the second surface profile comprising a top curved surface, wherein the bottom curved surface and the top curved surface cooperatively adjust light from the light source to obtain an asymmetric light field.

9. The illumination device of claim 8, wherein the bottom curved surface is a saddle-shaped concavity, and the top curved surface is convex.

10. The illumination device of claim 8, wherein the first surface profile further comprises a bottom planar surface surrounding the first trench, and the bottom planar surface and a light emitting surface of the light emitting element are substantially located at same level.

11. The illumination device of claim 8, wherein the base defines a second trench housing the light emitting element.

12. The illumination device of claim 8, wherein the second surface profile further comprises two top planar surfaces connected to the top curved surface and substantially parallel to a light emitting surface of the light emitting element.

13. The illumination device of claim 8, wherein the bottom curved surface is a locus of points (X, Y, Z) in accordance with a formula:

$$Z=A_0+A_1X^2+A_2X^4+A_3X^6+A_4X^8+B_1Y+B_2Y^2+B_3Y^3+B_4Y^4+B_5Y^5+B_6Y^6+B_7Y^7+B_8Y^8+B_9Y^9;$$

at least one of constants $A_0, A_1, A_2, A_3$ and $A_4$ is not zero, and at least one of constants $B_1, B_2, B_3, B_4, B_5, B_6, B_7, B_8$ and $B_9$ is not zero.

14. The illumination device of claim 13, wherein the top curved surface is a locus of points (X, Y, Z) in accordance with a formula:

$$Z=C_0+C_1X^2+C_2X^4+C_3X^6+C_4X^8+D_1Y+D_2Y^2+D_3Y^3+D_4Y^4+D_5Y^5+D_6Y^6+D_7Y^7+D_8Y^8+D_9Y^9;$$

at least one of constants $C_0$, $C_1$, $C_2$, $C_3$ and $C_4$ is not zero, and at least one of constants $D_1$, $D_2$, $D_3$, $D_4$, $D_5$, $D_6$, $D_7$, $D_8$ and $D_9$ is not zero.

15. The illumination device of claim 14, wherein the light emitting element is located at a point that (X, Y)=(0, 0).

16. A lens configured for being applied to a light emitting element to adjust light from the light emitting element, comprising:

a first surface profile defining a first trench facing the light emitting element, the first trench comprising a bottom curved surface serving as a light incident surface; and a second surface profile serving as a light emitting surface opposite to the first surface profile, the second surface profile comprising a top curved surface, wherein both the bottom curved surface and the top curved surface are mirror symmetric to a first suppositional plane, and mirror asymmetric to a second suppositional plane perpendicular to the first suppositional plane to cooperatively adjust the light from the light emitting element to obtain an asymmetric light field;

wherein the bottom curved surface is a locus of points (X, Y, Z) in accordance with a formula:

$$Z=A_0+A_1X^2+A_2X^4+A_3X^6+A_4X^8+B_1Y+B_2Y^2+B_3Y^3+B_4Y^4+B_5Y^5+B_6Y^6+B_7Y^7+B_8Y^8+B_9Y^9;$$

at least one of constants $A_0$, $A_1$, $A_2$, $A_3$ and $A_4$ is not zero, and at least one of constants $B_1$, $B_2$, $B_3$, $B_4$, $B_5$, $B_6$, $B_7$, $B_8$ and $B_9$ is not zero.

17. The lens of claim 16, wherein the constants $A_1$, $A_2$, $A_3$, $A_4$, $B_1$, $B_2$, $B_3$, $B_4$, $B_5$, $B_6$, $B_7$, $B_8$ and $B_9$ of the bottom curved surface are in a range from $-2.7 \times 10^{-1}$ to $-2.6 \times 10^{-1}$, in a range from $6.8 \times 10^{-3}$ to $6.9 \times 10^{-3}$, in a range from $1.0 \times 10^{-4}$ to $1.1 \times 10^{-4}$, in a range from $-1.9 \times 10^{-6}$ to $-1.8 \times 10^{-6}$, in a range from $-4.4 \times 10^{-1}$ to $-4.3 \times 10^{-1}$, in a range from $2.6 \times 10^{-2}$ to $2.7 \times 10^{-2}$, in a range from $1.2 \times 10^{-2}$ to $1.3 \times 10^{-2}$, in a range from $1.9 \times 10^{-4}$ to $2.0 \times 10^{-4}$, in a range from $1.9 \times 10^{-4}$ to $2.0 \times 10^{-4}$, in a range from $-1.4 \times 10^{-5}$ to $-1.3 \times 10^{-5}$, in a range from $1.4 \times 10^{-8}$ to $1.5 \times 10^{-8}$, in a range from $-2.0 \times 10^{-9}$ to $-1.9 \times 10^{-9}$, and in a range from $2.0 \times 10^{-10}$ to $2.1 \times 10^{-10}$ respectively.

18. The lens of claim 16, wherein the constants $A_1$, $A_2$, $A_3$, $A_4$, $B_1$, $B_2$, $B_3$, $B_4$, $B_5$, $B_6$, $B_7$, $B_8$ and $B_9$ of the bottom curved surface are in a range from $1.6 \times 10^{-2}$ to $1.7 \times 10^{-2}$, in a range from $4.2 \times 10^{-4}$ to $4.3 \times 10^{-4}$, in a range from $-2.3 \times 10^{-5}$ to $-2.2 \times 10^{-5}$, in a range from $-2.6 \times 10^{-1}$ to $-2.5 \times 10^{-1}$, in a range from $3.2 \times 10^{-2}$ to $3.3 \times 10^{-2}$, in a range from $4.1 \times 10^{-3}$ to $4.2 \times 10^{-3}$, in a range from $-2.4 \times 10^{-4}$ to $-2.3 \times 10^{-4}$, in a range from $-1.1 \times 10^{-4}$ to $-1.0 \times 10^{-4}$, in a range from $-7.0 \times 10^{-6}$ to $-6.9 \times 10^{-6}$, in a range from $6.1 \times 10^{-8}$ to $6.2 \times 10^{-8}$, in a range from $-2.9 \times 10^{-9}$ to $-2.8 \times 10^{-9}$, and in a range from $-1.3 \times 10^{-9}$ to $-1.2 \times 10^{-9}$ respectively.

19. The lens of claim 16, wherein the top curved surface is a locus of points (X, Y, Z) in accordance with a formula:

$$Z=C_0+C_1X^2+C_2X^4+C_3X^6+C_4X^8+D_1Y+D_2Y^2+D_3Y^3+D_4Y^4+D_5Y^5+D_6Y^6+D_7Y^7+D_8Y^8+D_9Y^9;$$

at least one of constants $C_0$, $C_1$, $C_2$, $C_3$ and $C_4$ is not zero, and at least one of constants $D_1$, $D_2$, $D_3$, $D_4$, $D_5$, $D_6$, $D_7$, $D_8$ and $D_9$ is not zero.

* * * * *